United States Patent [19]

Fujinami

[11] Patent Number: 5,317,396
[45] Date of Patent: May 31, 1994

[54] HIGHLY EFFICIENT ENCODING APPARATUS

[75] Inventor: Yasushi Fujinami, Kanagawa, Japan

[73] Assignee: Sony Corporation, Tokyo, Japan

[21] Appl. No.: 828,294

[22] Filed: Jan. 30, 1992

[30] Foreign Application Priority Data

Feb. 8, 1991 [JP] Japan .................................. 3-039349

[51] Int. Cl.⁵ .............................................. H04N 7/12
[52] U.S. Cl. .................................. 343/390; 348/415
[58] Field of Search ................................ 358/133, 136

[56] References Cited

U.S. PATENT DOCUMENTS 4,797,945  1/1989  Suzuki et al. ...................... 382/56
4,965,754 10/1990  Stansfield et al. ................. 358/133

FOREIGN PATENT DOCUMENTS 0084270  7/1983  European Pat. Off. .
0409310  1/1991  European Pat. Off. .
0435163  3/1991  European Pat. Off. .
62-92620  4/1987  Japan .

OTHER PUBLICATIONS

Jayant, "Digital Coding of Waveforms", 1984, pp. 188 to 199 and 290 to 301.
Patent Abstracts of Japan, vol. 13, No. 128 (E-735) Mar. 29, 1989 & JP-A-63 296 583 (Fujitsu) Feb. 5, 1993 Dec. 1988.
Patent Abstracts of Japan vol. 7, No. 88 (E-170) (1233) Apr. 12, 1983 & JP-A-58 014 688 (Nippon Denshi Denwa Kosha) Jan. 27, 1983.

Primary Examiner—Alvin E. Oberley
Assistant Examiner—Minsun Oh
Attorney, Agent, or Firm—William S. Frommer; Alvin Sinderbrand

[57] ABSTRACT

The complication of a pattern of each macro block is predetermined by feed-forward. When a macro block is determined as a complicate pattern, a particular value is added to a quantizing step width and thereby the quantizing step width is increased. Since the quantizing step width of macro blocks of complicate patterns is increased, the amount of data which is generated for macro blocks of non-complicate patterns is increased. Thus, excessive bits which are generated due to suppression of the amount of data for macro blocks of complicate patterns are assigned to those of non-complicate patterns.

3 Claims, 8 Drawing Sheets

HIGHLY EFFICIENT ENCODING APPARATUS

BACKGROUND OF THE INVENTION

1. Field of the Invention

The present invention relates to a highly efficient encoding apparatus, in particular, relates to a highly efficient encoding apparatus suitable for compressing data of a video signal.

2. Description of the Prior Art

Thus far a variety of highly efficient encoding apparatuses for compressing data of a video signal have been proposed. For example, a highly efficient encoding apparatus proposed by the patent applicant as Japanese Patent Laid-open Publication No. SHO 62-92620 discloses a technique for adaptively quantizing data of pictures.

MPEG (Moving Picture Experts Group) has recommended a data compression system with respect to moving pictures. In this recommendation, one frame picture is constructed of 240 lines in the vertical scanning direction, each line being constructed of 352 picture elements, each frame being divided into macro blocks MB constructed of 16 picture elements ×16 picture elements. Thus, one frame picture is constructed of 22 macro blocks MB in the horizontal scanning direction and 15 macro blocks MB in the vertical scanning direction.

FIG. 1 shows a circuit construction of a highly efficient encoding apparatus using DCT (Discrete Cosine Transform).

A video signal SV is supplied to an A/D converter 81 through a terminal 80. The A/D converter 81 converts the video signal SV into video data DV. The video data DV is supplied to a frame buffer 82.

An address generator 83 forms a write address ADW. The write address ADW is supplied to the frame buffer 82.

The video data DV is written to the frame buffer 82 in accordance with the above mentioned write address ADW. With respect to the video data Dv written to the frame buffer 82, each frame is constructed of 240 lines (that is, 240 picture elements) in the vertical scanning direction, one line being constructed of 352 picture elements.

The address generator 83 forms a read address ADR. The read address ADR is supplied to the frame buffer 82.

The frame buffer 82 reads the video data DV in accordance with the above mentioned read address ADR The video data Dv is read from the frame buffer 82 macro block MB by macro block MB, which is constructed of 16 picture elements ×16 picture elements. The video data DV which is read macro block MB by macro block MB is supplied to a data generation circuit 84.

The data generation circuit 84 divides each macro block MB into blocks constructed of eight picture elements ×eight picture elements. Thus, one macro block MB is divided into four blocks.

After video data DV is DCT-processed block by block, it is quantized and converted into a code with a variable length. Thereby, data is compressed and new video data DV0 is formed. After the video data Dv0 is written to a buffer memory 85, it is read in succession. Thereafter, the video data DV0 is supplied or transmitted to the following circuit through a terminal 87.

A control circuit 86 monitors the capacity of write enable areas of the buffer memory 85 so as to prevent the buffer memory 85 from being overflown with video data DV. This is done to control a data generation parameter frame by frame or multiple frames by multiple frames (for example, 15 frames by 15 frames) so that the amount of data which is generated nearly becomes a constant value because a macro block MB of a non-complicate pattern does not generate a large amount of data, while that of a complicate pattern generates a large amount of data. As an example of the method for monitoring the capacity of the write enable areas, a value of a write address counter and a value of a read address counter in the buffer memory 85 are used. The buffer memory 85, the control circuit 86, and the data generation circuit 84 construct a feed-back loop.

The prior art shown in FIG. 1 had the following problems.

(1) When a picture has partially a complicate pattern, for example, a portion with many edges, the portion causes a large amount of data to be generated. In this case, the feed-back loop constructed of the buffer memory 85, the control circuit 86, and the data generation circuit 84 operates and the control is performed to decrease the amount of data which is generated. However, since the feed-back loop has a delay, when a simple pattern following a complicate pattern is controlled as mentioned above, the picture quality is deteriorated.

(2) Since the control by the feed-back loop constructed of the buffer memory 85, the control circuit 86, and the data generation circuit 84 is always accompanied by a delay, when a large amount of data is abruptly generated as in the case of the above mentioned portion with a complicate pattern, the buffer memory 85 is inevitably overflown.

OBJECTS AND SUMMARY OF THE INVENTION

Therefore, an object of the present invention is to provide a highly efficient encoding apparatus for improving a picture quality and for preventing a data overflow.

According to an aspect of the present invention, there is provided a highly efficient encoding apparatus in which each frame of an input video signal is divided into blocks with predetermined size and a highly efficient encoding process and a quantizing process are performed the block by the block, and a quantizing step width is varied in accordance with the input video signal in the quantizing process to control the amount of data which is generated, comprising:

means for determining complication of a pattern the block by the block, wherein the quantizing step width of the quantizing process is varied in accordance with the result of the determination by the means for determining complication of a pattern.

DETAILED DESCRIPTION OF THE PREFERRED EMBODIMENTS

Now an embodiment of the present invention is described with reference to FIGS. 2 to 8.

Before describing the embodiment in detail, the basic concept of the present invention is presented.

In data compression of a video signal SV data should be compressed so that the picture quality of at least important portions is not deteriorated. In other words, the best picture quality should be accomplished with a particular amount of data.

Figure 5:
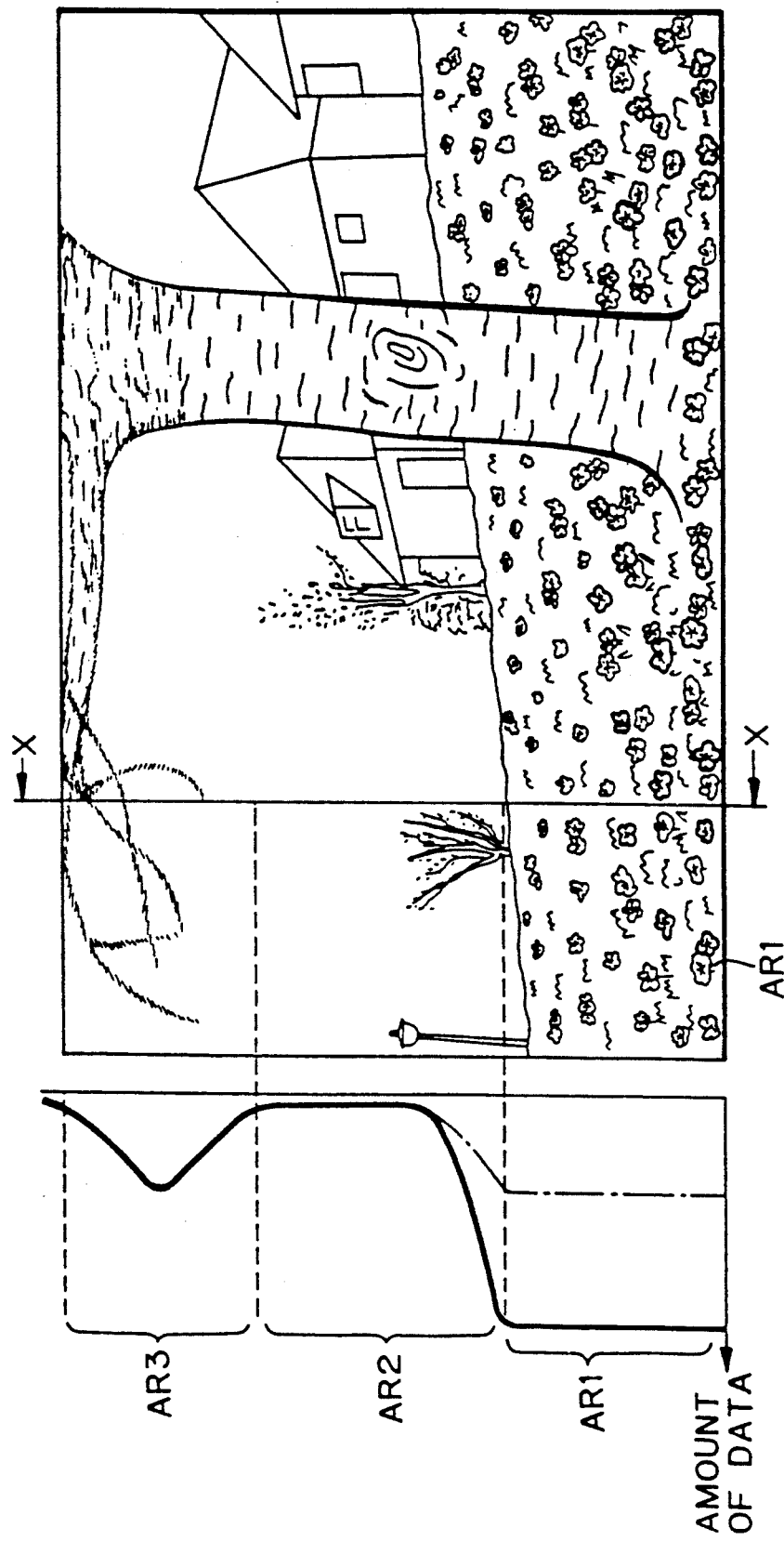
FIG. 5 is a picture used to describe the embodiment and a schematic diagram showing the distribution of the amount of data.

When a picture as shown in FIG. 5 is encoded, the distribution of the amount of data which is generated along an arrow X is represented with a schematic diagram on the left hand of the figure. As is obvious from FIG. 5, with respect to the amount of data which is generated along the arrow X, a part AR1 which is a flower bed represents a highest level; a part AR3 at an upper portion of the picture represents a second highest level; and a part AR2 in the middle of the picture represents a lowest level.

Since the flower bed part AR1 at a lower portion of the picture is comparatively complicate, the amount of data which is generated is large. However, the overall amount of data should be constant. Therefore, in this condition, the amount of data which is generated in other than the flower bed part AR1 is suppressed and the picture quality of, for example, the part AR3 at the upper portion of the picture is deteriorated.

To solve such a problem, it is necessary to suppress the amount of data which is generated at the flower bed part AR1 and to assign the excessive bits generated thereby to other portions other than the flower bed part AR1.

It is generally said that even if the amount of data which is generated in a complicate, that is, complex portion such as the flower bed part AR1 is reduced by using a large quantizing step width, the deterioration of picture quality is not correspondingly sensed. Thus, in the present invention, to prevent the picture quality of the part AR3 at the upper portion of the picture from being deteriorated, before an encoding process such as DCT is performed, portions with complicate patterns are predetected by the feed-forward, that is, the complexity of the pattern is determined and then the quantizing step width of these complex portions is increased and thereby the amount of data which is generated for the complicate patterns is reduced or suppressed. In contrast, with respect to the other portions, the quantizing step width is not changed based on the detection of the complicate patterns and thereby the amount of data which is generated is not suppressed. Consequently, this operation is equivalent to assignment of excessive bits to portions other than complicate portions.

Figure 1:
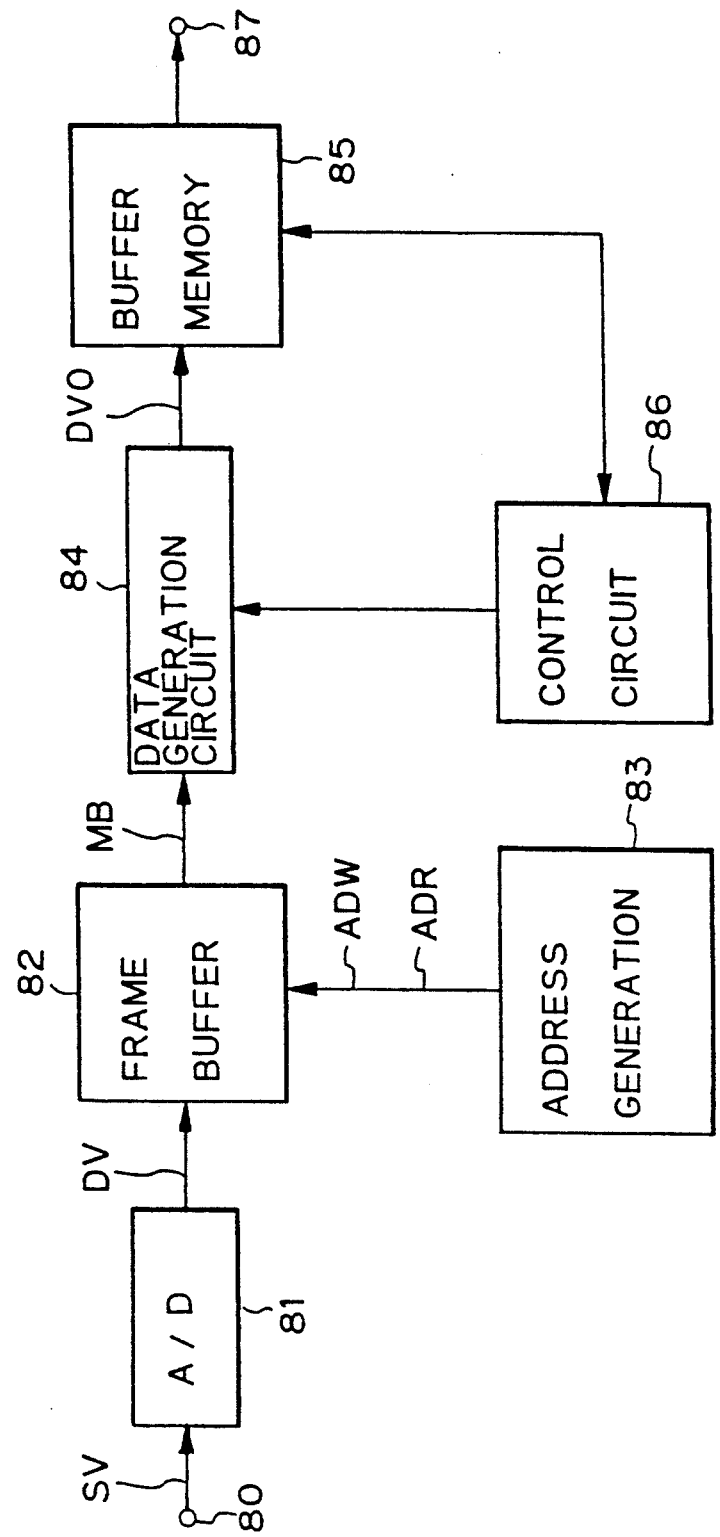
FIG. 1 is a block diagram showing a prior art.
Figure 2:
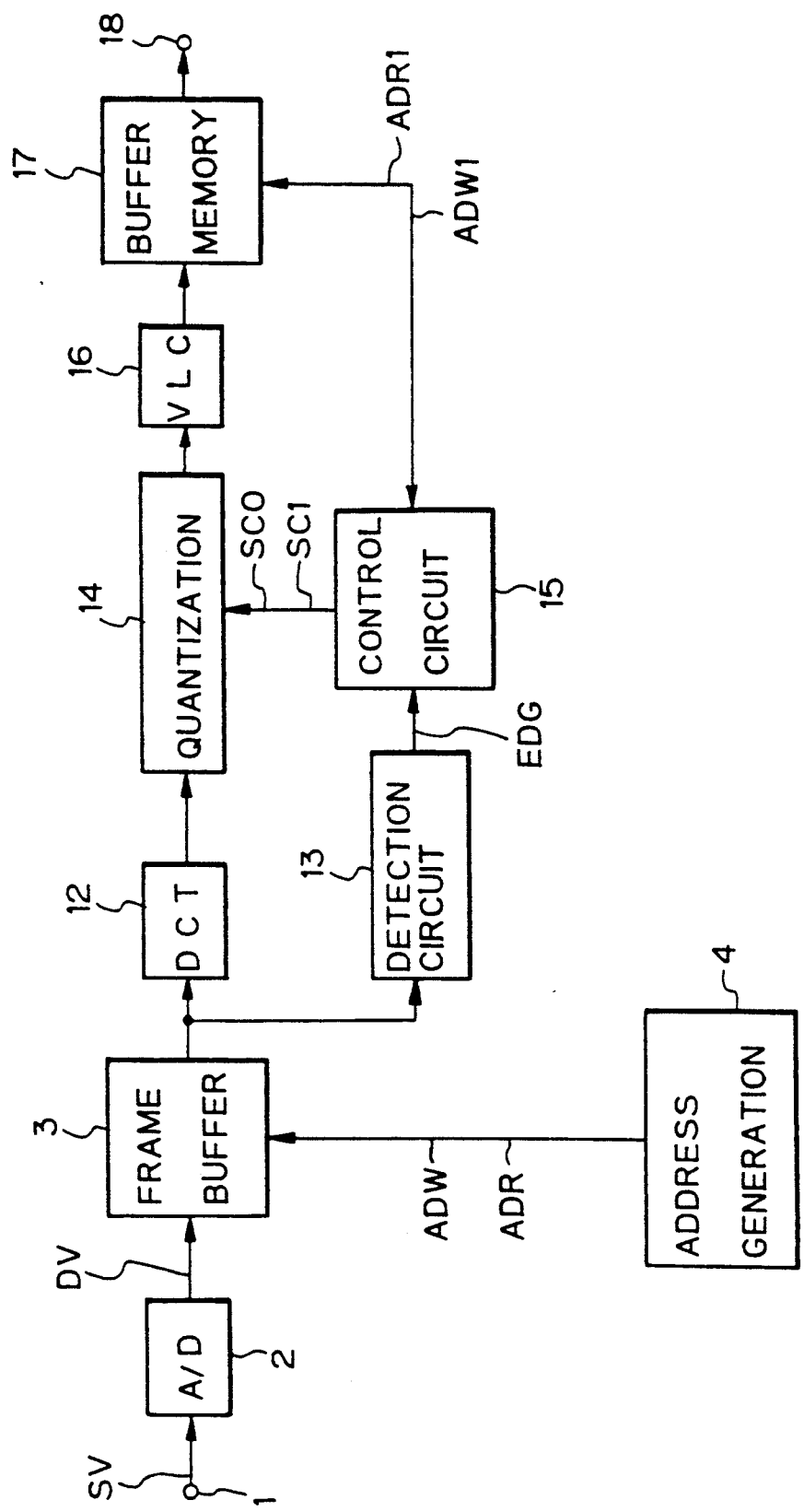
FIG. 2 is a block diagram showing an embodiment of a highly efficient encoding apparatus according to the present invention.

In the construction shown in FIG. 2, a video signal SV is supplied to an A/D converter 2 through a terminal 1. The A/D converter 2 converts the video signal SV into video data DV. The video data DV is supplied to a frame buffer circuit 3.

An address generator 4 forms a write address ADW. The write address ADW is supplied to the frame buffer circuit 3.

The video data DV is written to the frame buffer circuit 3 in accordance with the write address ADW.

Figure 3:
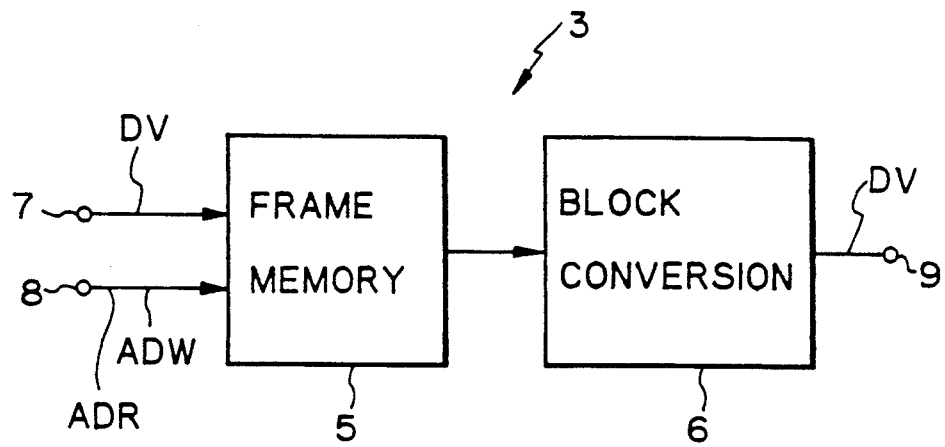
FIG. 3 is a block diagram showing the detail of a frame buffer circuit.

FIG. 3 shows the construction of the frame buffer circuit 3.

As shown in FIG. 3, the frame buffer circuit 3 chiefly comprises a frame memory 5 and a block conversion circuit 6.

The video data DV is supplied to the frame memory 5 through a terminal 7. In addition, a write address ADW is supplied to the frame memory 5 through a terminal 8. Thus, the video data DV is written in succession to an address specified by the write address ADW. The number of picture elements in one frame of the video data DV is 240 lines (that is, 240 picture elements) in the vertical scanning direction as defined by the above mentioned MPEG, each line being constructed of 352 picture elements.

The address generator 4 forms a read address ADR. The read address ADR is supplied to the frame buffer circuit 3.

When the read address ADR is supplied to the frame memory 5 of the frame buffer circuit 5 through the terminal 8, the video data DV being stored is read and supplied to the block conversion circuit 6.

Figure 4:
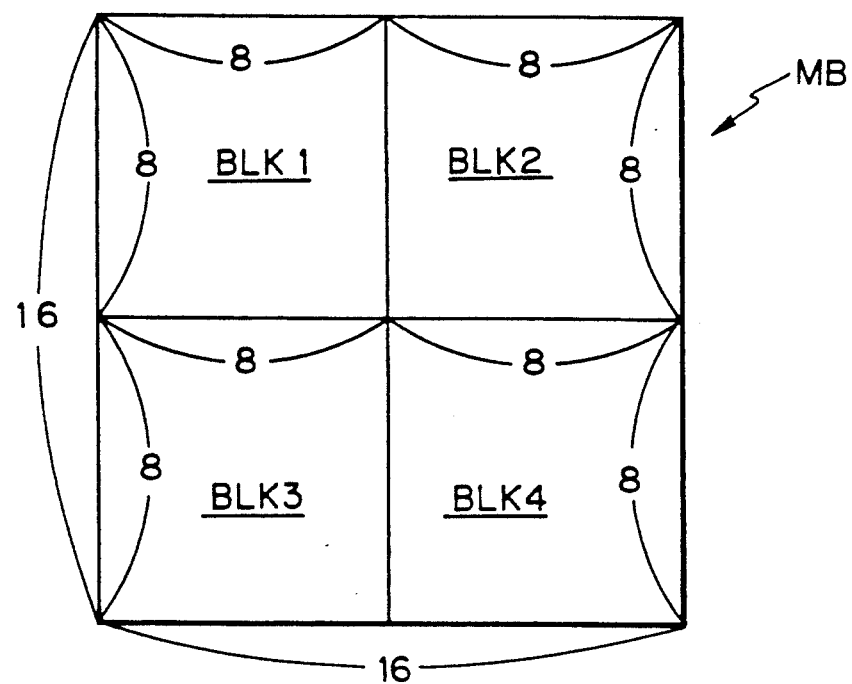
FIG. 4 is a schematic diagram showing the construction of a macro block.

As shown in FIG. 4, the block conversion circuit 6 divides macro blocks MB constructed of 16 picture elements ×16 picture elements into blocks BLK1 to BLK4, each of which is constructed of eight picture elements x eight picture elements. The video data Dv is supplied to a DCT circuit 12 and a detection circuit 13 block by block (BLK1 to BLK4).

The DCT circuit 12 performs DCT process for the video data Dv which is supplied block by block (BLK1 to BLK4) and forms a matrix of eight rows x eight columns (8×8) for conversion coefficients which represent frequency components. The conversion coefficients are supplied to a quantizing circuit 14.

The detection circuit 13 determines whether the video data DV supplied from the frame buffer circuit 3 is a complicate pattern or a non-complicate pattern macro block MB by macro block MB. This determination timing should be preceded by a macro block MB to be processed.

In this embodiment, the determination of whether or not a pattern is complicate is made only with macro blocks MB of a luminance signal Y constructed of blocks BLK1 to BLK4, each of which is constructed of 8×8 picture elements. Then, this determination method is described with reference to FIG. 6. Since this determination method is in common with all blocks BLK1 to BLK4, only block BLK1 is exemplified.

Figure 6:
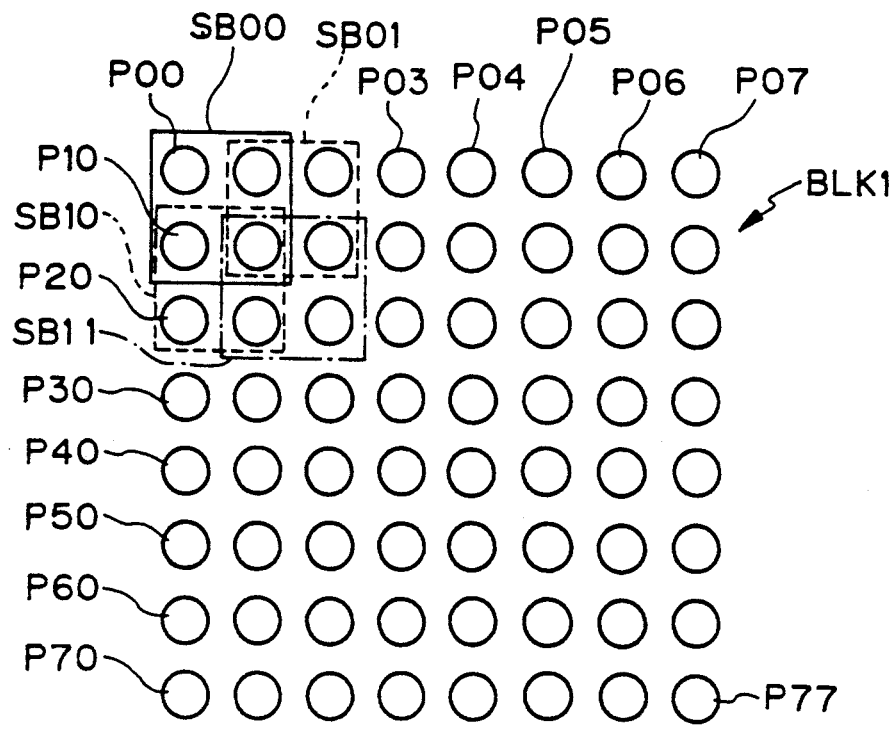
FIG. 6 is a schematic diagram showing an arrangement of a sample block.
Figure 7:
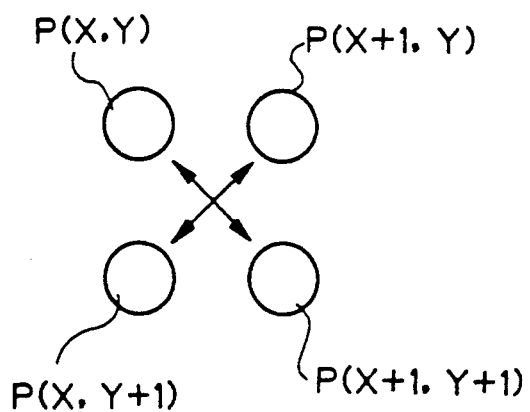
FIG. 7 is a schematic diagram showing an edge detection of a sample block.

In FIG. 6, Pxy (where x=0, 1, ..., 7 and y=0, 1, ..., 7) are picture elements. In the block BLK1 49 sample blocks SBxy (where x=0, 1, ..., 6 and y=0, 1, ..., 6), each sample block SBxy being constructed of 2×2 picture element Pxy. In individual adjacent sample blocks SBxy, one picture element P is overlapped.

In FIG. 6, picture element data Yxy of the sample block SB is expressed with the following equation.

$$SB = \begin{pmatrix} Y_{(x,y)} & Y_{(x+1,y)} \\ Y_{(x,y+1)} & Y_{(x+1,y+1)} \end{pmatrix}_{x=0\ldots(7-1), y=0\ldots(7-1)}$$

The complication of a pattern is determined depending on whether or not a sample block SBxy is an edge. When an edge is detected, the square of the difference of luminance levels of diagonal elements is used. In other words, with each sample block SBxy, two values are obtained. When the larger value is greater than, for example, 4,000, it is determined that the sample block SBxy is an edge.

This edge detection is expressed with the following equation.

if max $[(Y(x\ y)-Y(x+1,\ y+1))^2, (Y(x+1,\ y)-Y(x\ y+1))^2] > 4000$ then edge

One macro block MB is constructed of, for example, 196 (=4×49) sample blocks SBxy. If edges are detected in a predetermined number of sample blocks SBxy, for example, 65 or more sample block SBxy, it is determined that the macro block MB is a complicate pattern. At that time, the detection circuit 13 supplies to the control circuit 15 an edge detection signal EDG which is in high level.

The basis of the determination of the complication of a pattern with the predetermined number of sample blocks SBxy (in this example, 65 sample blocks SBxy) is described.

In this embodiment, when the difference of luminance levels of diagonal elements is 25% or more of the dynamic range of luminance ($2^8=256$) (thus, 28×0.25=64), the sample block SBxy is determined as an edge ($64^2>4000$).

In addition, when edges are detected from one third or more of sample blocks SBxy ($196\times(\frac{1}{3})>65$), the macro block MB is determined as a complicate pattern.

This criterion is not definitely used. Rather, the criterion may vary depending on the contents of a picture and other conditions.

When an edge detection signal EDG which is in high level is supplied from the detection circuit 13 to the control circuit 15, a control signal SC0 is formed in the control circuit 15 and supplied to the quantizing circuit 14. Alternatively, a control signal SC1 is formed in accordance with the capacity of write enable areas of the buffer memory 17 and supplied to the quantizing circuit 14. As methods for detecting the capacity of the write enable areas of the buffer memory 17 in the control circuit 15, it is also possible to use a method using the numbers of pieces of data which are written and read in addition t the above mentioned method using the value of the write address counter and the value of the read address counter. Thus, an overflow and an underflow of the buffer memory 17 can be prevented.

The quantizes circuit 14 quantifies conversion coefficients supplied from the DCT circuit 12. A quantizing step width of the quantizing circuit 14 is controlled in accordance with the control signals SC0 and SC1.

In the quantizing circuit 14, the quantizing step width is adaptively controlled in accordance with the control signals SC0 and SC1 supplied from the control circuit 15 macro block MB by macro block MB.

When a macro block MB is determined as a complicate pattern in accordance with the control signal SC0, a predetermined value, for example, "16", is added to the quantizing step width so as to increase and round the quantizing step width. As the quantizing step width becomes large, quantized data becomes small and the variable length encoding circuit 16 in the following stage assigns a code with a short variable length, so that the amount of data which is generated can be suppressed. Thus, the buffer memory 17 can be prevented from an overflow and an underflow.

When a macro block MB is determined as a non-complicate pattern in accordance with the control signal SC0, a quantizing step width where the above mentioned predetermined value is not added is used.

Increasing a quantizing step width for macro blocks MB of a complicate pattern allows consequently the increase of the amount of data which is generated for macro blocks MB of a non-complicate pattern. This is equivalent to assign excessive bits generated due to the suppression of the amount of data for macro blocks MB of a complicate pattern to macro blocks MB of a non-complicate pattern.

When the control signal SC1 is supplied from the control circuit 15, the quantizing step width is adaptively controlled in accordance with the capacity of the write enable areas of the buffer memory 17 in the same manner as the operation in accordance with the above mentioned control signal SC0. The quantized data is supplied to the variable length encoding circuit 16.

The variable length encoding circuit 16 converts the quantized data into data with variable length. By the above mentioned DCT, quantization, and conversion into variable length code, the video data DV is compressed. The code with variable length is supplied to the buffer memory 17.

The code with variable length is written to the buffer memory 17 in accordance with a write address ADW supplied from the control circuit 15. In addition, the above mentioned capacity of the write enable areas is supplied to the control circuit 15. On the other hand, the code with variable length is read from the buffer memory 17 in accordance with a read address ADR supplied from the control circuit 15. The code with variable length is obtained through a terminal 18 and then supplied or transmitted to the following circuit.

Figure 8:
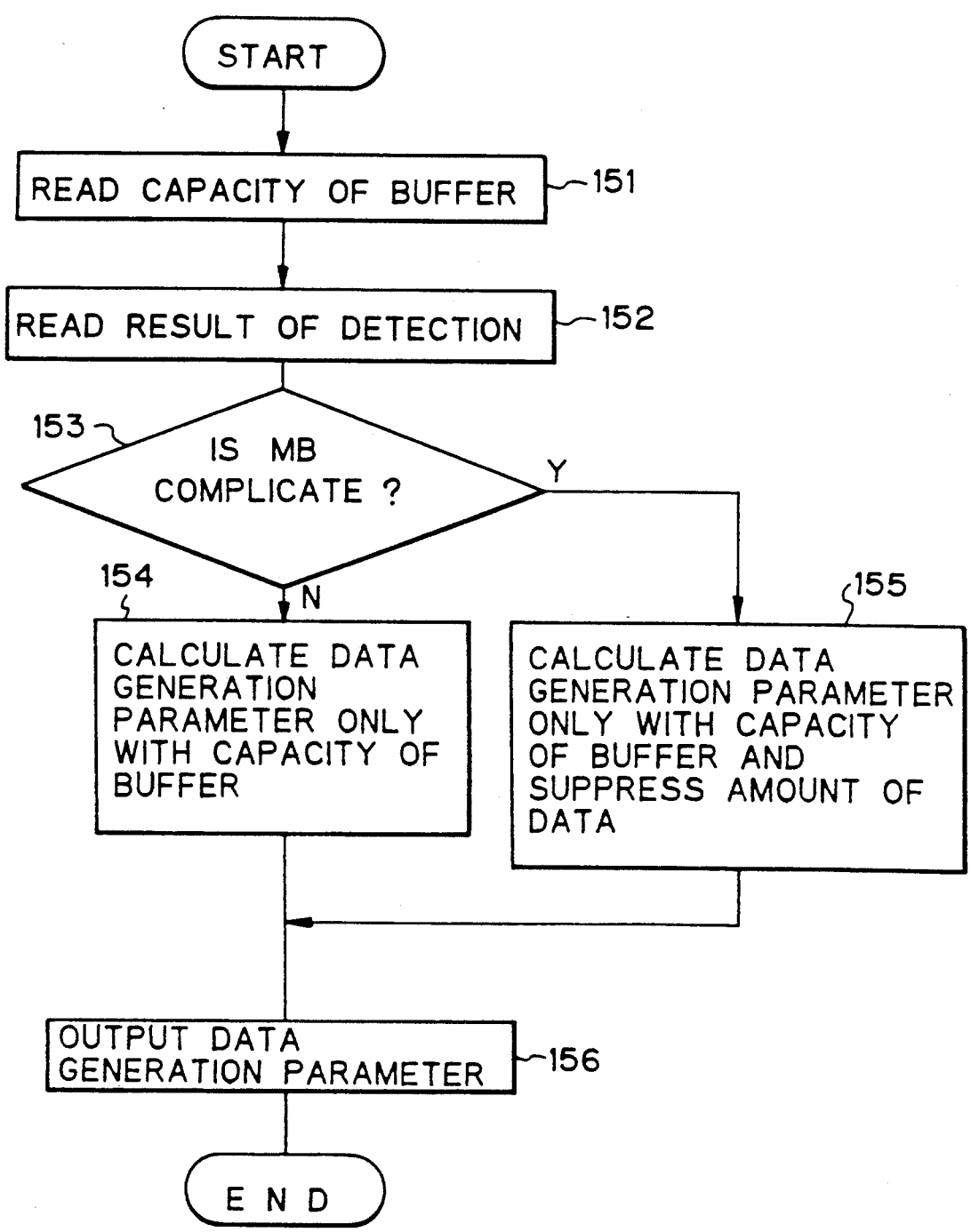
FIG. 8 is a flow chart showing a process of a control circuit.

The operation of the control circuit 15 is described with reference to FIG. 8.

At step 151, the capacity of the write enable areas of the buffer memory 17 is read. Then the process is advanced to step 152.

At step 152, it is read whether or not an edge detection signal EDG which is in high level is output from the detection circuit 13. Then the process is advanced to step 153.

At step 153, it is determined whether or not the concerned macro block MB is a complicate pattern. When it is determined that the macro block MB is not a complicate pattern, the process is advanced to step 154. When it is determined that the macro block MB is a complicate pattern, the process is advanced to step 155.

At step 154, the quantizing step width is adaptively controlled in accordance with the capacity of the write enable areas of the buffer memory 17 which is read at step 151. Then the process is advanced to step 156.

At step 155, a predetermined value, for example, "16", is added to the quantizing step width formed in accordance with the capacity of the write enable areas of the buffer memory 17 which is read at step 151 for each macro block MB so as to increase the quantizing step width and then the increased quantizing step width is rounded. Thereafter, the process is advanced to step 156.

At step 156, the adaptively determined quantizing step width is supplied as a data generation parameter to the quantizing circuit 14 macro block MB by macro block MB.

According to the embodiment, the complication of a pattern is predetermined by feed-forward macro block MB by macro block MB. When a macro block MB is determined as a complicate pattern, a predetermined value is added to the quantizing step width so as to increase the the quantizing step width. Thus, since the amount of data which is generated for a macro block MB of a complicate pattern can be suppressed, abrupt occurrence of a large amount of data in the complicate pattern can be prevented and the buffer memory 17 can be prevented from being overflown.

As mentioned above, increasing the quantizing step width for macro blocks MB of complicate patterns leads to the increase of the amount of data which is generated for macro blocks MB of non-complicate patterns. In other words, it is equivalent to assign excessive bits generated due to the suppression of the amount of data which is generated for the macro blocks MB of complicate patterns to macro blocks MB of non-complicate patterns. Thus, overall picture quality can be improved.

Figure 9:
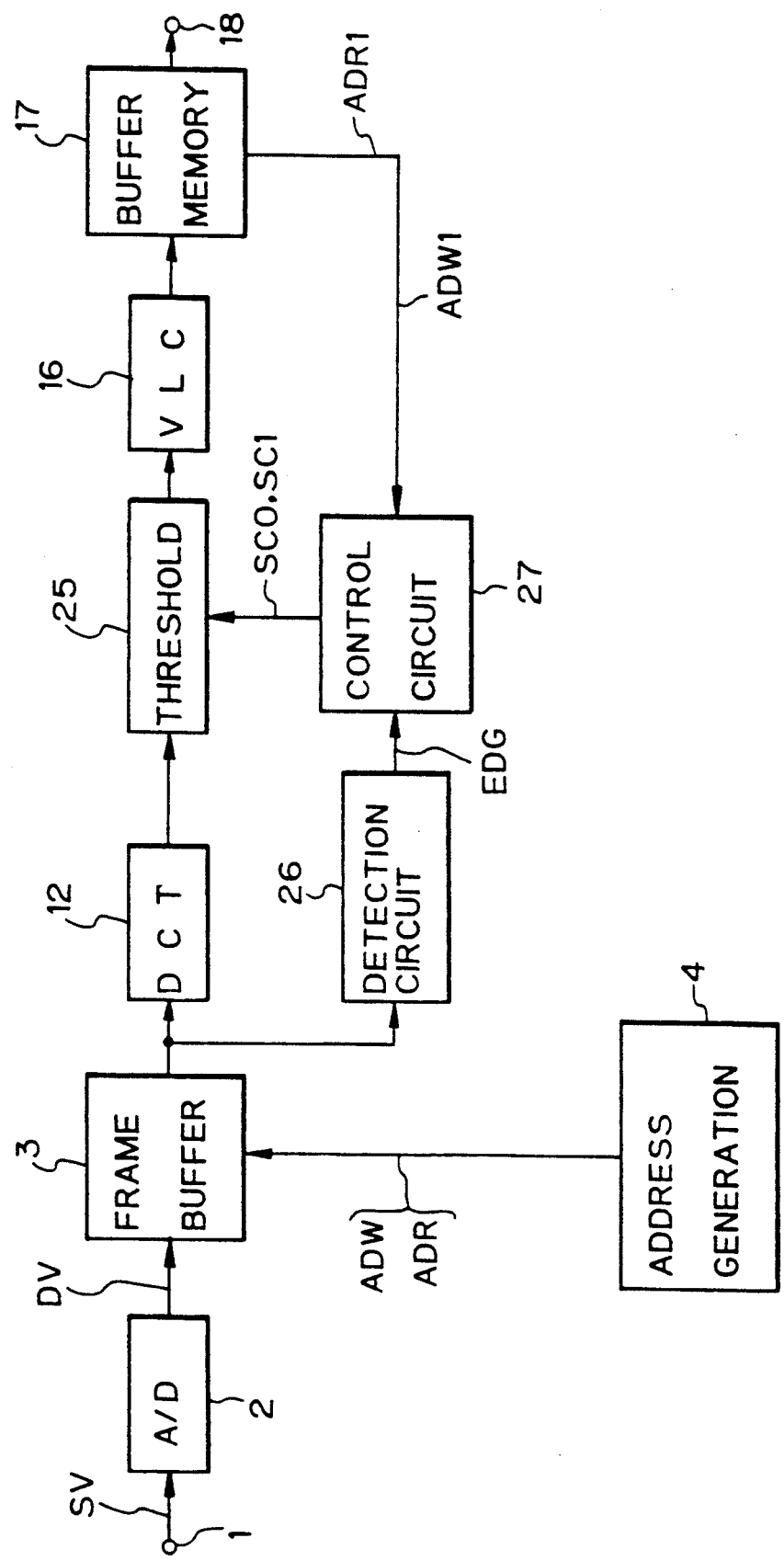
FIG. 9 is a block diagram showing another embodiment according to the present invention.

Another embodiment of the present invention is described with reference to FIG. 9.

The difference between another embodiment and the aforementioned embodiment is that the amount of data which is generated is suppressed with a threshold circuit 25 instead of the quantizing circuit 14 used in the aforementioned embodiment.

When a macro block MB can be classified into blocks BLK of complicate patterns and blocks BLK of non-complicate patterns, the threshold level of the blocks BLK of the complicate patterns is adaptively varied from that of the blocks BLK of non-complicate patterns so that the former is higher than the latter.

With respect to the present embodiment, only portions which differ from the aforementioned embodiment are described. The same reference numerals are attached to the portions which are in common with the aforementioned embodiment and their overlapped description is omitted.

A detection circuit 26 determines whether video data DV supplied from a frame buffer circuit 3 is a complicate pattern or a non-complicate pattern block by block (BLK1 to BLK4), each of which is constructed of 8×8 picture elements. The determination method of the complication of the patterns is the same as that of the aforementioned embodiment. When a particular block BLK1 to BLK4 is determined as a complicate pattern, the detection circuit 26 supplies an edge detection signal EDG which is in high level to a control circuit 27.

When the above mentioned detection circuit 13 supplies an edge detection signal EDG which is in high level to the control circuit 15, it forms a control signal SC0 and supplies it to a threshold circuit 25. Alternatively, the control circuit 15 forms a control signal SC1 in accordance with the capacity of the write enable areas of a buffer memory 17 and supplies the control signal SC1 to a threshold circuit 25.

The threshold circuit 25 adaptively controls the above mentioned threshold level in accordance with the control signal SC0 or the control signal SC1 supplied from the control circuit 27 block by block (BLK1 to BLK4). In other words, when a block BLK1 to BLK4 is determined as a complicate pattern, the threshold level is raised to a predetermined value.

When conversion coefficients supplied from the DCT circuit 12 exceed the threshold level, the threshold circuit 25 uses the conversion coefficients as they are. When the conversion coefficients are lower than the threshold level, the threshold circuit 25 treats all conversion coefficients supplied from the DCT circuit 12 as "zero" data. When the threshold level is raised, the amount of data which is generated can be suppressed.

Since the other portions of the present embodiment are the same as those of the aforementioned embodiment, their overlapped description is omitted.

According to the present embodiment, when a block BLK1 to BLK4 is determined as a complicate pattern, since the threshold level is raised to a predetermined level, the amount of data which is generated can be suppressed.

The other effects of the present embodiment are the same as those of the aforementioned embodiment.

Figure 10:
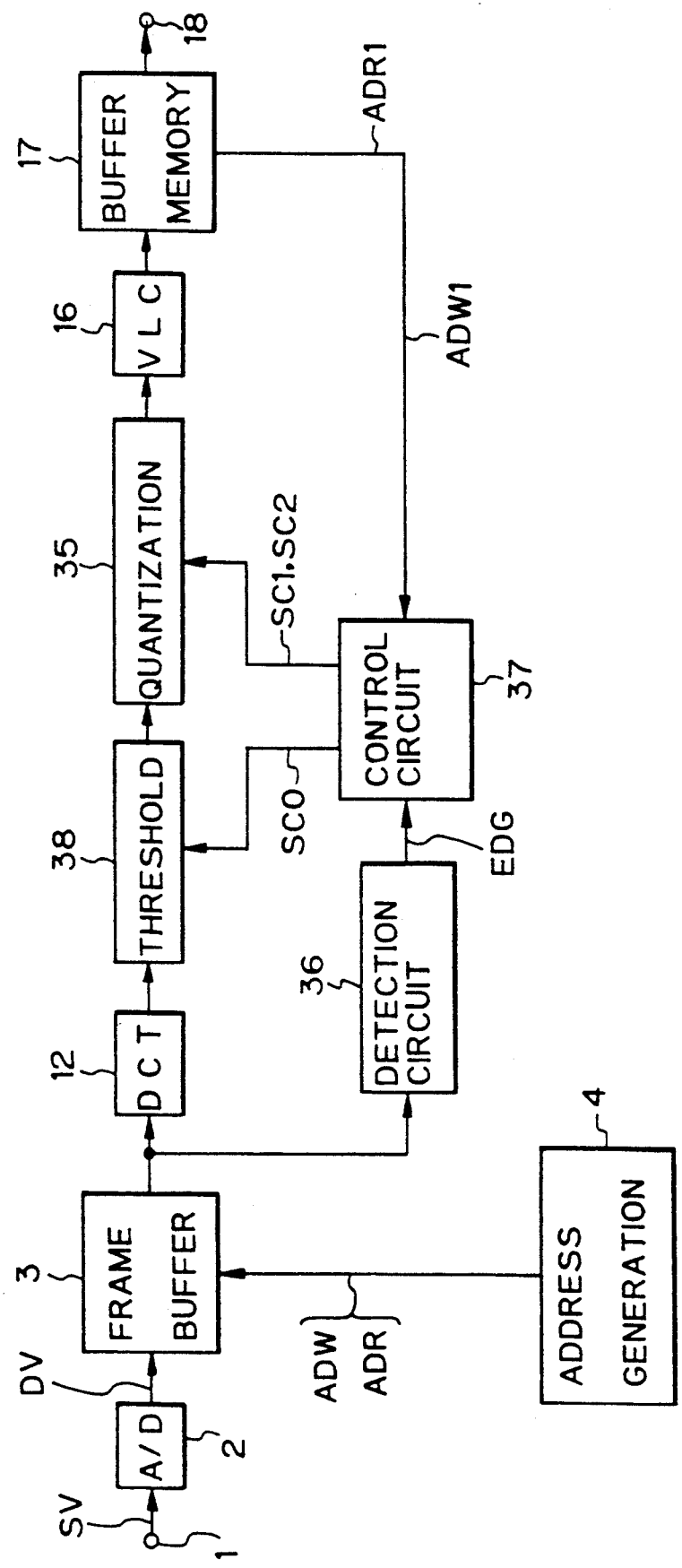
FIG. 10 is a block diagram showing the further embodiment according to the present invention.

A further embodiment of the present invention is described with reference to FIG. 10.

The difference between the present embodiment and the aforementioned embodiments is that the amount of data which is generated is suppressed with a threshold circuit 38 and a quantizing circuit 35. In other words, when a macro block MB can be classified into blocks BLK of complicate patterns and blocks BLK of non-complicate patterns, the threshold level of the blocks BLK of complicate patterns is adaptively varied from that of the blocks BLK of non-complicate patterns so that the former is higher than the latter. In addition, the quantizing step width is adaptively varied macro block MB by macro block MB.

In the present embodiment, only portions which differ from the aforementioned embodiments are described. The same reference numerals are attached to the portions which are in common with the aforementioned embodiments and their overlapped description is omitted.

A detection circuit 36 determines whether video data DV supplied from a frame buffer circuit 3 is a complicate pattern or a non-complicate pattern block by block (BLK1 to BLK4), each of which is constructed of 8×8 picture elements. The determination method of the complication of the patterns is the same as that of the aforementioned embodiment. When a block BLK1 to BLK4 is determined as a complicate pattern, the detection circuit 26 supplies an edge detection signal EDG which is in high level to a control circuit 27.

When the above mentioned detection circuit 13 supplies an edge detection signal EDG which is in high level to a control circuit 37, it forms a control signal SC0 and supplies it to a threshold circuit 25. When the edge detection signal EDG which is in high level satisfies a particular condition, the control circuit 37 supplies a control signal SC2 to the quantizing circuit 35. Alternatively, the control circuit 37 forms a control signal SC1 in accordance with the capacity of the write enable areas of a buffer memory 17 and supplies the control signal SC1 to a quantizing circuit 35.

The threshold circuit 38 adaptively controls the above mentioned threshold level in accordance with the control signal SC0 supplied from the control circuit 37 block by block (BLK1 to BLK4). When a block BLK1 to BLK4 is determined as a complicate pattern, the above mentioned threshold level is raised to the predetermined value.

When conversion coefficients supplied from a DCT circuit 12 exceed the threshold level, the threshold circuit 38 uses the above mentioned conversion coefficients as they are. When the conversion coefficients are lower than the threshold level, the threshold circuit 38 treats the conversion coefficients supplied from the DCT circuit 12 a "zero" data.

The quantizing circuit 35 adaptively controls the quantizing step width in accordance with the control signal SC1 or SC2 supplied from the control circuit 37 macro block MB by macro block MB. When the quantizing circuit 35 determines that the macro block MB has a complicate pattern block BLK and satisfies a predetermined condition, it adds a particular value, for example, "16" to the above mentioned quantizing step width so as to increase the quantizing step width and the increased quantizing step width is rounded.

Since the other portions of the present embodiment are the same as those of the aforementioned embodiments, their overlapped description is omitted.

According to the present embodiment, when a macro block MB can be classified into blocks BLK of complicate patterns and blocks BLK of non-complicate patterns, the threshold level of the blocks BLK of complicate patterns is adaptively varied from that of the blocks BLK of non-complicate patterns so that the former is larger than the latter. In addition, the quantizing step width is adaptively varied macro block MB by macro block MB. Thus, when the threshold level is increased, the amount of data which is generated can be suppressed. In addition, when the quantizing step width is increased, the quantized data becomes a small value and a code with short variable length is assigned. Thus, the amount of data which is generated can be further suppressed.

The other effects of the present embodiment are the same as those of the aforementioned embodiments.

According to the highly efficient encoding apparatus of the present invention, complicate pattern portions of each area with predetermined size in a frame of a video signal are determined by feed-forward before the signal is supplied to a highly efficient encoding means. When each area is determined as a complicate pattern, the data generation parameter is changed and the quantizing step width of the quantizing means is adaptively controlled. Thus, the amount of data which is generated from complicate pattern portions can be suppressed. In addition, abrupt occurrence of a large amount of data for the complicate patterns can be prevented and the buffer memory can be prevented from being overflown. Consequently, the amount of data which is generated for non-complicate pattern portions is increased and the overall picture quality can be improved.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A highly efficient encoding apparatus for encoding each frame of an input video signal including blocks of a predetermined size and each having a respective pattern, comprising:
    means for determining a complexity of said pattern in each of said blocks and for generating a control signal based on the determination of said complexity of said pattern in each of said blocks,
    an orthogonal transform circuit for producing conversion coefficients representing each of said blocks,
    means for setting said conversion coefficients to zero in accordance with said control signal,
    means for quantizing said conversion coefficients, as selectively set to zero by said means for setting said conversion coefficients to zero, using a quantizing step width to produce encoded data, and
    means for varying said quantizing step width in accordance with said determination of said complexity of said pattern in each of said blocks.

2. A highly efficient encoding apparatus for encoding each frame of an input video signal including blocks of a predetermined size and each having a respective pattern, comprising:
    means for determining a complexity of said pattern in each of said blocks,
    means for generating a control signal based on the determination of said complexity of said pattern in each of said blocks,
    an orthogonal transform circuit for producing conversion coefficients representing each of said blocks, and
    means for setting said conversion coefficients to zero in accordance with said control signal.

3. A highly efficient encoding apparatus for encoding each frame of an input video signal including blocks of predetermined size and each having a respective pattern, comprising:
    an orthogonal transform circuit for producing conversion coefficients representing each of said blocks,
    means for determining a complexity of said pattern in each of said blocks,
    means for generating a control signal based on the determination of said complexity of said pattern in each of said blocks,
    means for setting said conversion coefficients to zero in accordance with said control signal so as to produce threshold exceeding coefficients representing each of said blocks,
    means for quantizing said threshold exceeding coefficients using a quantizing step width to produce encoded data, and
    means for varying said quantizing step width in accordance with said determination of said complexity of said pattern in each of said blocks.

* * * * *